United States Patent
O'Connor et al.

(10) Patent No.: US 10,053,040 B1
(45) Date of Patent: Aug. 21, 2018

(54) RESTRAINT SYSTEM

(71) Applicant: Ford Global Technologies, LLC, Dearborn, MI (US)

(72) Inventors: Christopher Stephen O'Connor, Livonia, MI (US); Jacob Wookeun Lee, Novi, MI (US)

(73) Assignee: FORD GLOBAL TEHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/479,346

(22) Filed: Apr. 5, 2017

(51) Int. Cl.
| | |
|---|---|
| *B60R 21/16* | (2006.01) |
| *B60R 21/015* | (2006.01) |
| *B60R 21/0136* | (2006.01) |
| *B60R 21/206* | (2011.01) |
| *B60R 21/233* | (2006.01) |
| *B60R 21/2338* | (2011.01) |
| *B60R 21/00* | (2006.01) |
| *B60R 21/01* | (2006.01) |
| *B60R 21/013* | (2006.01) |

(Continued)

(52) U.S. Cl.
CPC .... *B60R 21/01554* (2014.10); *B60R 21/0136* (2013.01); *B60R 21/206* (2013.01); *B60R 21/233* (2013.01); *B60R 21/2338* (2013.01); *B60R 21/264* (2013.01); *B60R 2021/0009* (2013.01); *B60R 2021/0044* (2013.01); *B60R 2021/0048* (2013.01); *B60R 2021/0051* (2013.01); *B60R 2021/0055* (2013.01); *B60R 2021/0102* (2013.01); *B60R 2021/01027* (2013.01); *B60R 2021/01034* (2013.01); *B60R 2021/01211* (2013.01); *B60R 2021/01315* (2013.01); *B60R 2021/161* (2013.01); *B60R 2021/23169* (2013.01); *B60R 2021/23384* (2013.01); *B60R 2021/23514* (2013.01); *B60R 2021/23542* (2013.01)

(58) Field of Classification Search
CPC ........... B60R 21/0136; B60R 21/2338; B60R 21/263; B60R 2021/2648; B60R 2021/0009; B60R 2021/0048; B60R 2021/01013; B60R 2021/23384
USPC .................................. 280/732, 743.1, 743.2
See application file for complete search history.

(56) References Cited

U.S. PATENT DOCUMENTS 7,377,546 B2 * 5/2008 Fischer ................. B60R 21/233
280/736
7,618,061 B2 * 11/2009 Eckelberg ............... B60R 21/23
280/743.1

(Continued)

FOREIGN PATENT DOCUMENTS

| DE | 19530219 A1 | 4/1996 |
| DE | 10355764 B3 | 5/2005 |
| JP | 2008114648 A | 5/2008 |

*Primary Examiner* — Toan C To
(74) *Attorney, Agent, or Firm* — Frank A. MacKenzie; Bejin Bieneman PLC

(57) ABSTRACT

A restraint system includes an instrument panel. The restraint system includes an airbag coupled to the instrument panel and having an impact panel facing away from the instrument panel when the airbag is inflated. The impact panel has a left half and a right half. A left tether is releasably coupled to the instrument panel and to the left half of the impact panel. A right tether is releasably coupled to the instrument panel and to the right half of the impact panel. A controller is programmed to selectively release one of the left and right tethers based on an impact angle.

18 Claims, 9 Drawing Sheets

(51) Int. Cl.
 *B60R 21/231* (2011.01)
 *B60R 21/264* (2006.01)
 *B60R 21/235* (2006.01)

(56) References Cited

U.S. PATENT DOCUMENTS

| | | |
|---|---|---|
| 9,272,684 B1 | 3/2016 | Keyser et al. |
| 9,434,344 B2 | 9/2016 | Fukawatase |
| 2002/0158456 A1* | 10/2002 | Fischer ................. B60R 21/205 280/743.2 |
| 2008/0073891 A1* | 3/2008 | Rose ................... B60R 21/2338 280/739 |
| 2008/0073893 A1* | 3/2008 | Schneider ........... B60R 21/2338 280/740 |
| 2009/0224519 A1* | 9/2009 | Fukawatase .......... B60R 21/233 280/736 |
| 2011/0042926 A1* | 2/2011 | Mayer ................. B60R 21/0134 280/735 |
| 2015/0274116 A1* | 10/2015 | Jaradi ................. B60R 21/0136 701/45 |
| 2016/0046254 A1* | 2/2016 | Yamada ................ B60R 21/233 280/729 |
| 2016/0311392 A1* | 10/2016 | Jindal ................... B60R 21/231 |
| 2017/0129444 A1* | 5/2017 | Fukawatase .......... B60R 21/233 |
| 2017/0158154 A1* | 6/2017 | Kobayashi ........ B60R 21/01332 |

* cited by examiner

RESTRAINT SYSTEM

BACKGROUND

Vehicles are subject to impact testing for different types of frontal collisions. As one example, Federal Motor Vehicle Safety Standard (FMVSS) 208 provides a test procedure designed to simulate a frontal collision into, e.g., a wall. The test procedure provides that a test vehicle holding a test dummy as an occupant collides in a forward direction at 35 miles per hour into a stationary rigid barrier perpendicular to the path of the test vehicle. FMVSS 208 sets forth requirements for various measures of injury to the test dummy, simulating potential injury to an occupant of the vehicle, such as head injury criterion (HIC), chest deflection, and femur load.

Another test simulates an impact to the test vehicle from another vehicle at an oblique angle. Specifically, the test procedure provides that a moving deformable barrier impacts the test vehicle with a speed of 56 miles per hour at an offset of 35% from a center of a front of the vehicle and at an angle of 15° from a vehicle-forward direction. This test has been proposed by the National Highway Traffic Safety Administration (NHTSA) for inclusion in the US New Car Assessment Program (US-NCAP). One measurement for this test is a brain injury criterion (BrIC). The BrIC is a function of the maximum pitch, roll, and yaw of a head of the test dummy during the test, specifically, $$BrIC = \sqrt{\left(\frac{\omega_{xmax}}{66.3}\right)^2 + \left(\frac{\omega_{ymax}}{53.8}\right)^2 + \left(\frac{\omega_{zmax}}{41.5}\right)^2},$$

in which $\omega_{xmax}$ is the maximum roll velocity, $\omega_{ymax}$ is the maximum pitch velocity, and $\omega_{zmax}$ is the maximum yaw velocity, all measured in radians per second. Other possible measurements for this test include femur load, i.e., force imparted to a femur of the test dummy; and acetabulum load, i.e., force imparted to a hip socket of the test dummy.

DETAILED DESCRIPTION

Figure 1:
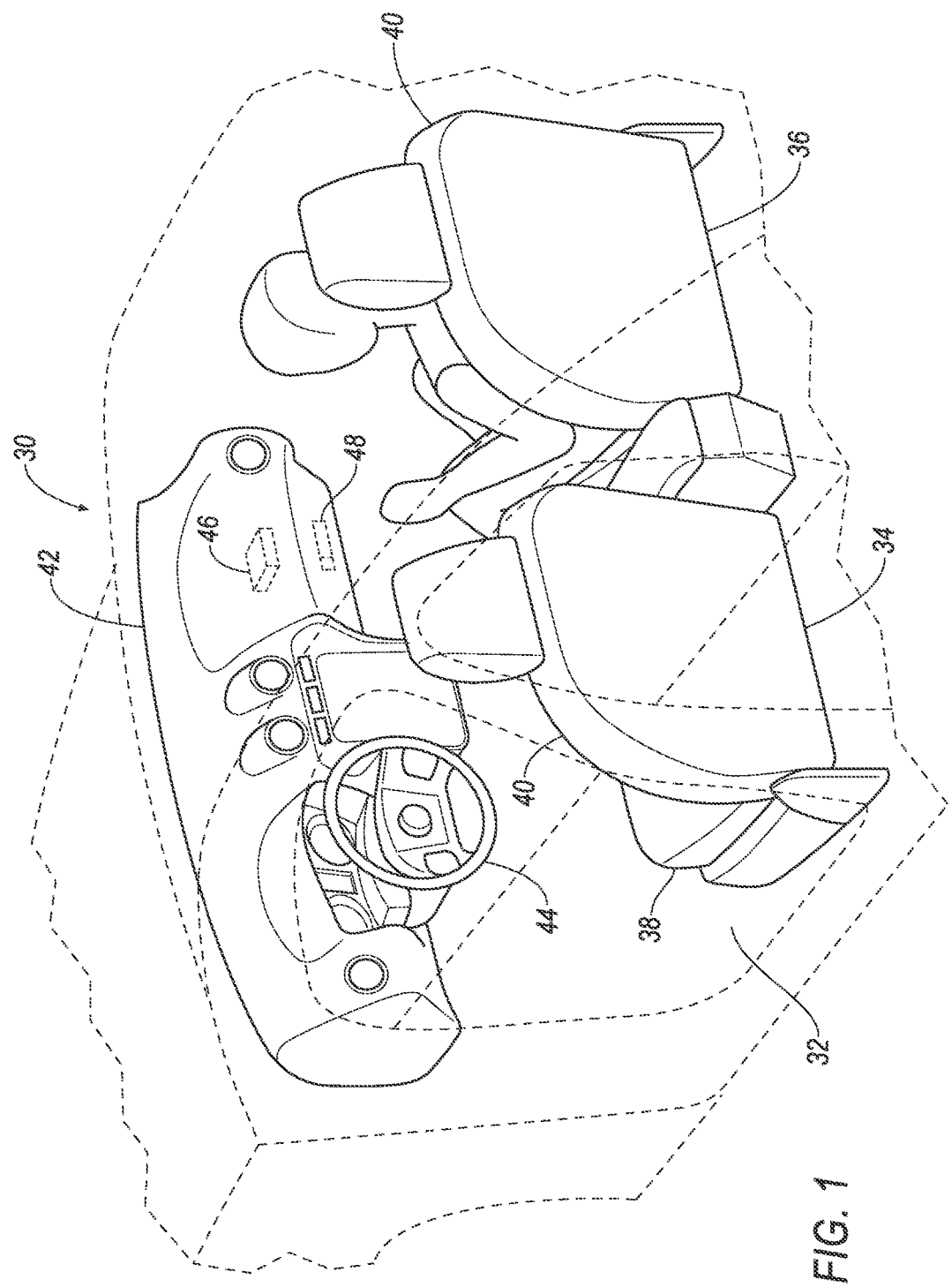
FIG. 1 is a perspective view of a passenger cabin in a vehicle.

A restraint system includes an instrument panel; an airbag coupled to the instrument panel and having an impact panel facing away from the instrument panel when the airbag is inflated, the impact panel having a left half and a right half; a left tether releasably coupled to the instrument panel and to the left half of the impact panel; a right tether releasably coupled to the instrument panel and to the right half of the impact panel; and a controller programmed to selectively release one of the left and right tethers based on an impact angle.

The controller may be programmed to release the left tether in response to a left oblique impact and to release the right tether in response to a right oblique impact. The controller may be programmed to retain the right tether in response to a left oblique impact and to retain the left tether in response to a right oblique impact. The controller may be programmed to receive a signal indicating lateral acceleration of the vehicle, determine that an absolute value of the lateral acceleration is below an acceleration threshold, and retain the tethers in response to determining that the absolute value of the lateral acceleration is below the acceleration threshold. The restraint system may include an inflator connected to the airbag and in communication with the controller, and the controller may be programmed to inflate the airbag in response to an impact. The controller may be programmed to receive a signal indicating a position of a seat, determine that the seat is farther forward than a longitudinal threshold, and retain the airbag in an uninflated position in response to determining that the seat is farther forward than the longitudinal threshold.

The restraint system may include a left ring through which the left tether extends and a right ring through which the right tether extends. The airbag may have a forward panel facing toward the instrument panel when the airbag is inflated, and the rings may be attached to the forward panel.

The restraint system may include an airbag housing coupled to the instrument panel, and the airbag may be inflatable from an uninflated position to an inflated position. The airbag in the uninflated position may be disposed in the airbag housing. The restraint system may include a left release mechanism and a right release mechanism fixed relative to the airbag housing and in communication with the controller. The left release mechanism may be positioned to release the left tether, and the right release mechanism may be positioned to release the right tether. The left release mechanism may be a left cutter positioned to sever the left tether, and the right release mechanism may be a right cutter positioned to sever the right tether. The left release mechanism may be a left release pin coupling the left tether to the airbag housing, and the right release mechanism may be a right release pin coupling the right tether to the airbag housing. The controller may be further programmed to selectively discharge the release pins based on an impact angle.

The restraint system may include an impact sensor in communication with the controller.

The airbag may be disposed to inflate at least partially below the instrument panel.

The airbag may be positioned to contact knees of a 50th percentile occupant of a seat facing the instrument panel when the airbag is inflated.

The restraint system may reduce the brain injury criterion (BrIC) experienced by an occupant during an oblique impact to the vehicle. During an oblique impact, a head of an occupant may twist while impacting a passenger airbag. The controller releases the tether closer to the side of the oblique impact and retains the tether farther from the side of the oblique impact, so the half of the airbag closer to the side of the oblique impact inflates more than the other half of the airbag. Pushing more on a knee of the occupant closer to the side of the impact may produce a twist on a body of the occupant tending to counteract the twist that may occur to the head of the occupant from the passenger airbag, which may reduce the maximum yaw velocity of the head of the occupant. The restraint system may also reduce the femur load and/or the acetabulum load experienced by the occupant.

With reference to FIG. 1, a vehicle 30 includes a passenger cabin 32 to house occupants, if any, of the vehicle 30. The vehicle 30 may be, for example, an automobile such as a car, truck, sport-utility vehicle (SUV), wagon, etc.

The passenger cabin 32 includes seats 34, 36, which may include a front driver seat 34 and a front passenger seat 36 disposed at a front of the passenger cabin 32 and one or more back seats (not shown) disposed behind the front seats 34, 36. The passenger cabin 32 may also include third-row seats (not shown) at a rear of the passenger cabin 32. In FIG. 1, the front seats 34, 36 are shown to be bucket seats, but the seats 34, 36 may be other types. Each of the seats 34, 36 may include a seat bottom 38 and a seatback 40. The position and orientation of the seats 34, 36 and components thereof may be adjustable by an occupant.

Figure 2:
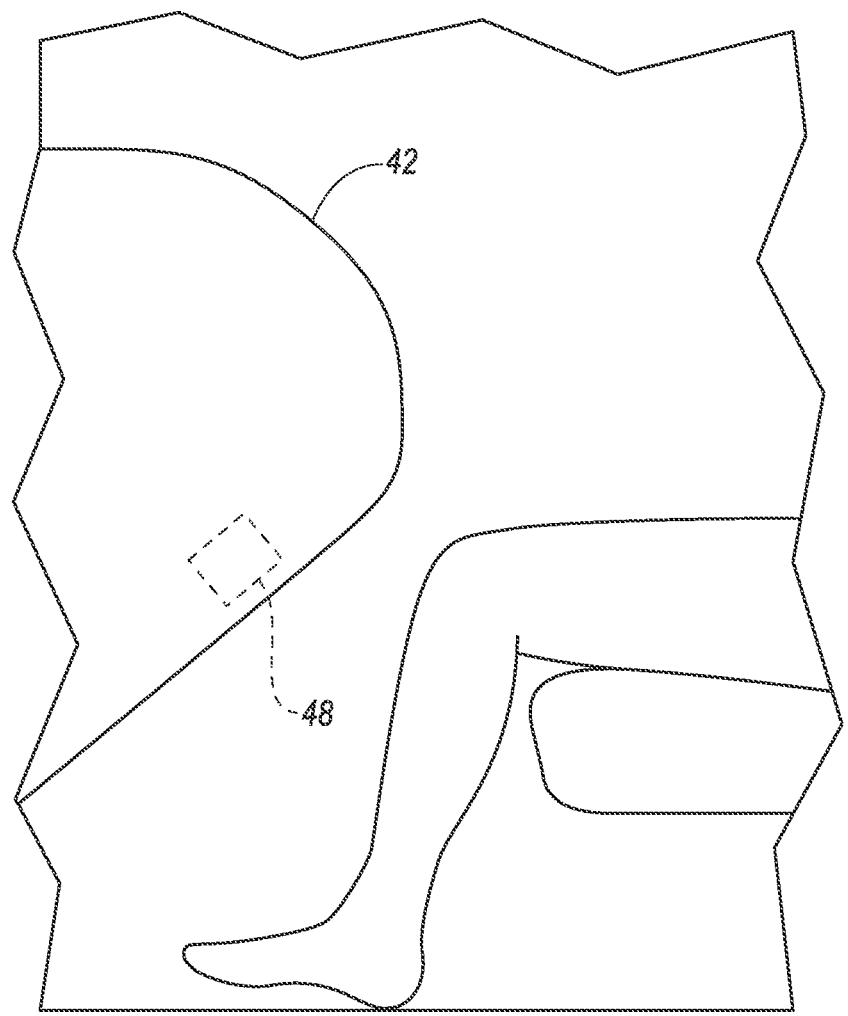
FIG. 2 is a side view of an instrument panel of the vehicle.
Figure 3:
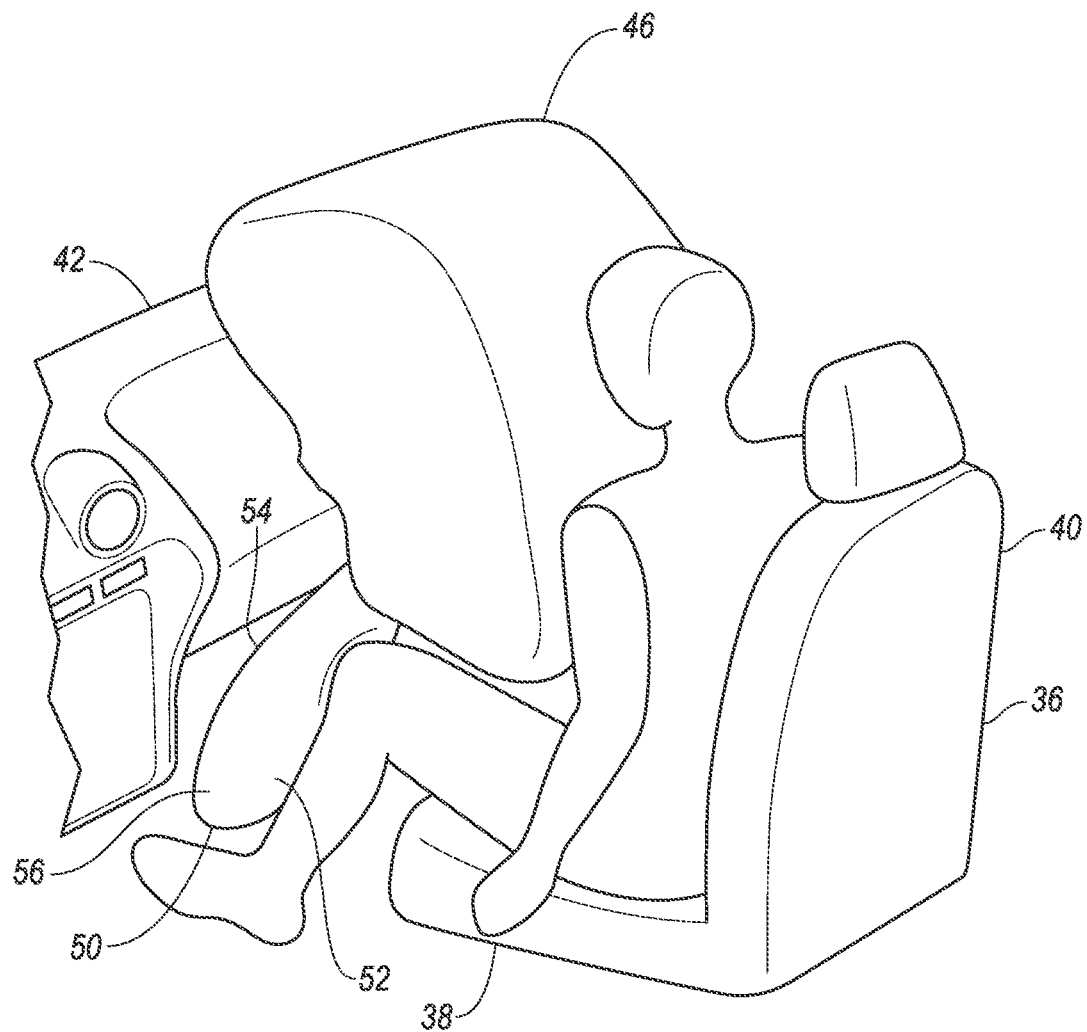
FIG. 3 is a perspective view of a portion of the passenger cabin with an airbag and a passenger airbag inflated.

With reference to FIGS. 1-3, an instrument panel 42 may be disposed at a forward end of the passenger cabin 32 and face toward the front seats 34, 36. The instrument panel 42 may include vehicle controls, including a steering wheel 44. The front seats 34, 36 may face the instrument panel 42.

A passenger airbag 46 may be inflatable from an uninflated position, as shown in FIGS. 1 and 2, to an inflated position, as shown in FIG. 3. In the uninflated position, the passenger airbag 46 may be disposed in the instrument panel 42 in front of the front passenger seat 36, that is, in a vehicle-forward direction from the front passenger seat 36. The passenger airbag 46 may be spaced from the steering wheel 44. In the inflated position, the passenger airbag 46 may be disposed between a torso and/or head of an occupant of the front passenger seat 36 and the instrument panel 42.

With reference to FIGS. 1, 2, and 5-8, an airbag housing 48 for a knee airbag 50 may be coupled to the instrument panel 42. For example, the airbag housing 48 may be fastened to the instrument panel 42. The airbag housing 48 may be disposed below the instrument panel 42, and may be disposed on a downward-facing panel of the instrument panel 42. The airbag housing 48 may be aligned in a vehicle-forward direction with the seat bottom 38 of the front passenger seat 36. The airbag housing 48 may extend partially around the knee airbag 50 when uninflated.

With reference to FIGS. 3-8, the knee airbag 50 is inflatable from an uninflated position, as shown in FIGS. 1 and 2, to an inflated position, as shown in FIGS. 3-8. The knee airbag 50 is coupled to the instrument panel 42, for example, via the airbag housing 48. The knee airbag 50 in the uninflated position may be disposed in the airbag housing 48. The knee airbag 50 is disposed to inflate at least partially below the instrument panel 42, that is, in a vehicle-downward direction relative to the instrument panel 42. The knee airbag 50 in the inflated position is disposed in front of the seat bottom 38 of the front passenger seat 36. The knee airbag 50 may be positioned to contact knees of an occupant, e.g., a 50th percentile occupant, of the front passenger seat 36 when the airbag is inflated.

The knee airbag 50 may have an impact panel 52 and a forward panel 54 surrounding an inflation chamber 56. The impact panel 52 may face away from the instrument panel 42 when the knee airbag 50 is inflated, i.e., is in the inflated position. The impact panel 52 may face in a vehicle-rearward direction and/or a vehicle-downward direction when the knee airbag 50 is in the inflated position. The forward panel 54 may face toward the instrument panel 42 when the knee airbag 50 is inflated, i.e., is in the inflated position. The forward panel 54 may face in a vehicle-forward direction and/or a vehicle-upward direction when the knee airbag 50 is in the inflated position. The impact panel 52 and the forward panel 54 may be approximately parallel to each other when the knee airbag 50 is in the inflated position.

The airbags 46, 50 may be formed of any suitable airbag material, for example, a woven polymer. For example, the airbags 46, 50 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane. The airbags 46, 50 may be formed of the same material and/or have the same coating or lack thereof, or the airbags 46, 50 may be formed of different materials and/or have different coatings.

Figure 4:
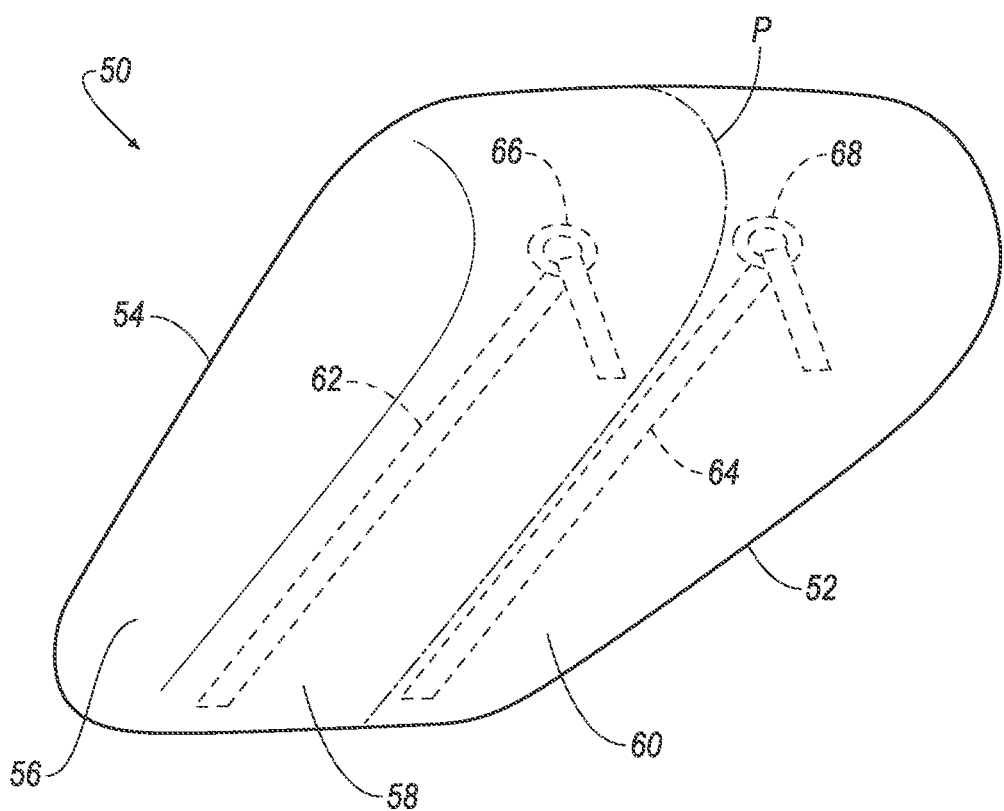
FIG. 4 is a perspective view of the airbag.
Figure 5:
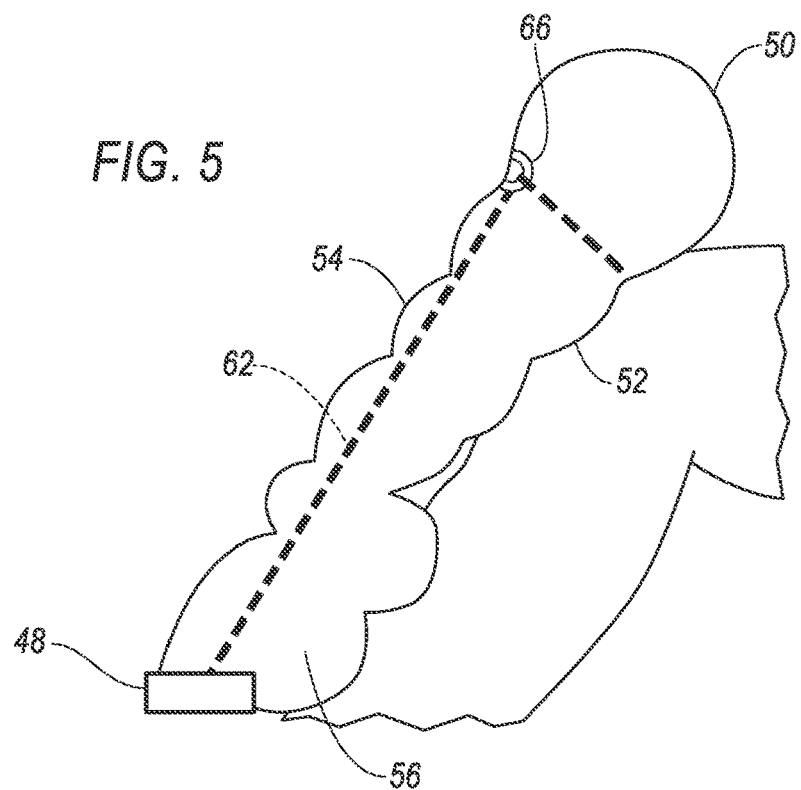
FIG. 5 is a cross-sectional side view of the airbag with a tether retained.
Figure 6:
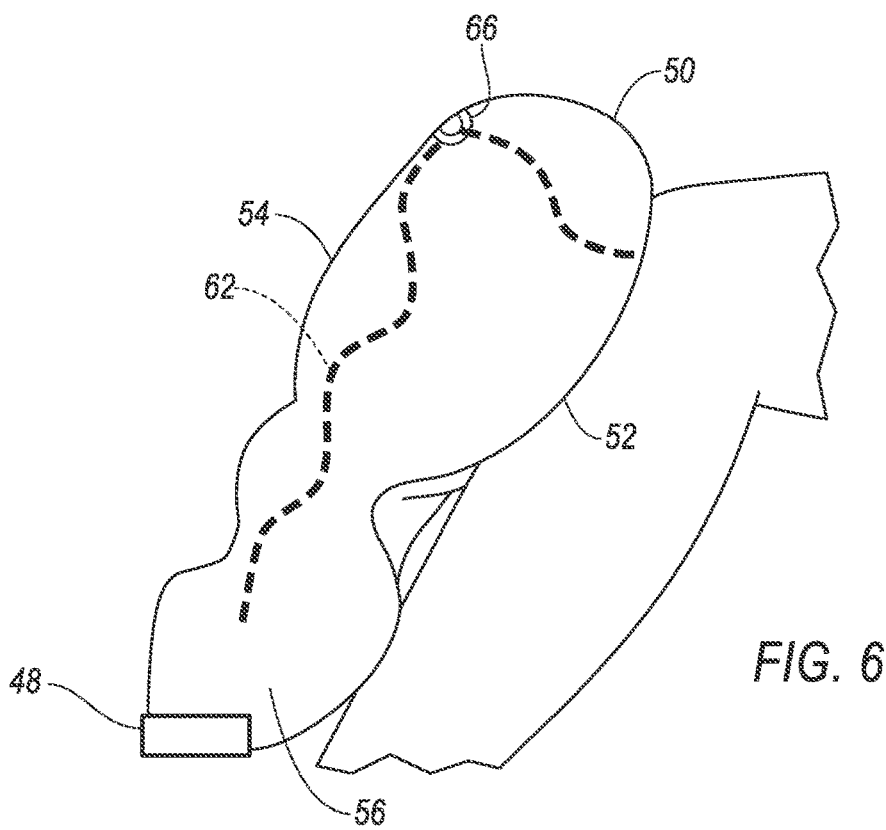
FIG. 6 is a cross-sectional side view of the airbag with the tether released.
Figure 7:
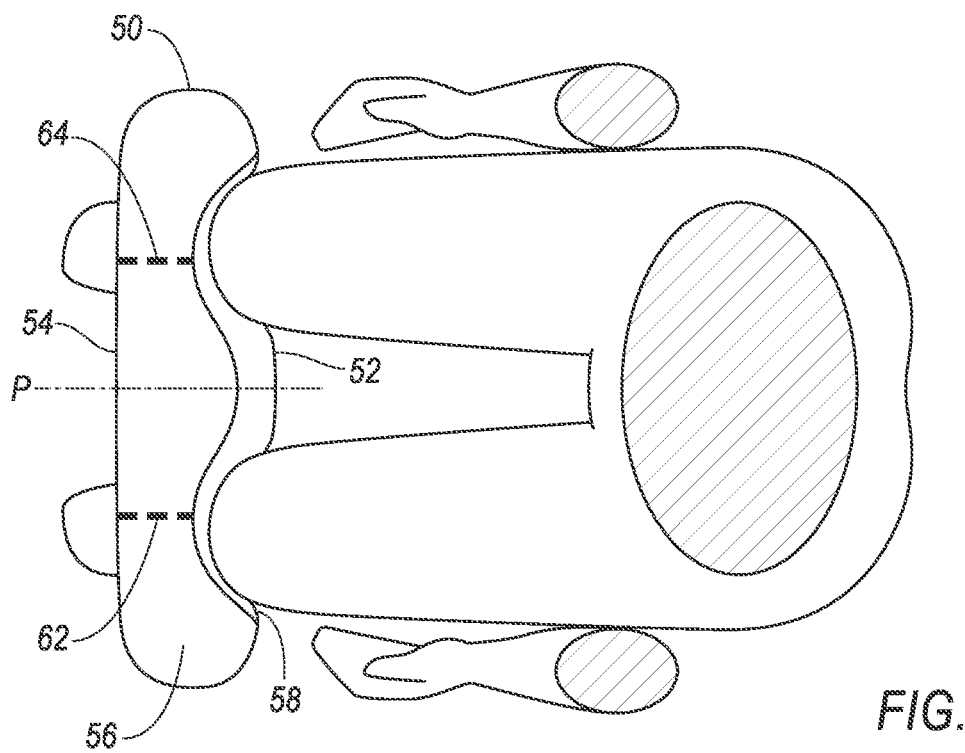
FIG. 7 is a top view of the airbag with the tether retained.
Figure 8:
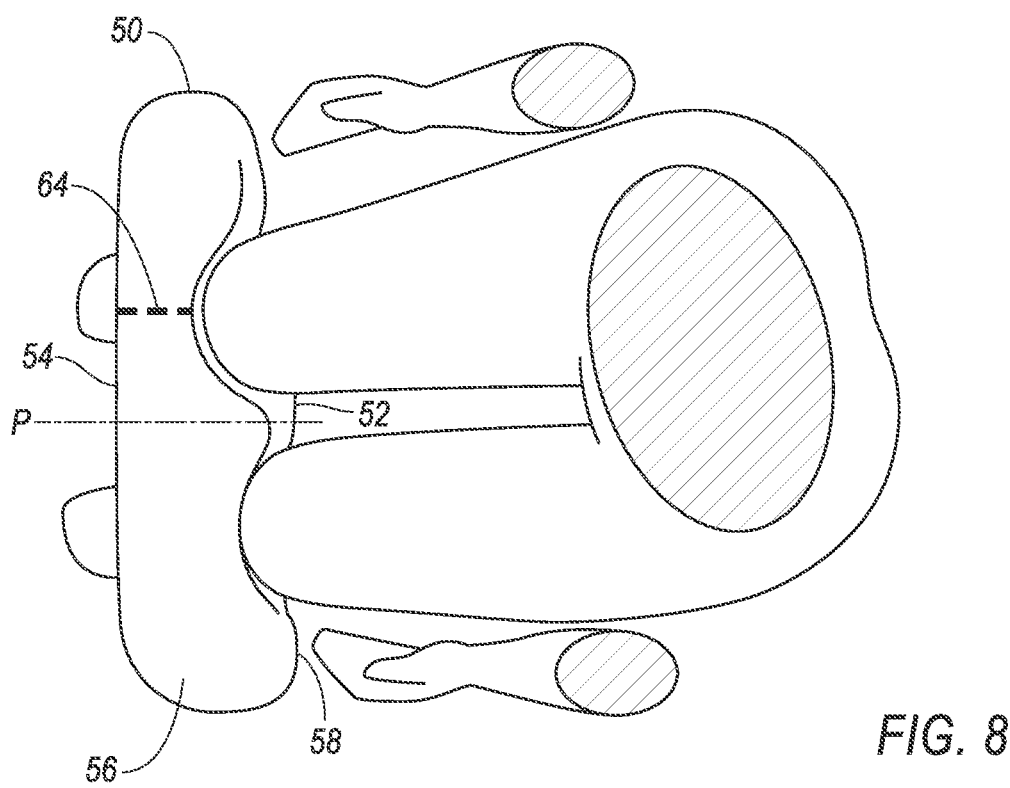
FIG. 8 is a top view of the airbag with the tether released.

With reference to FIGS. 3 and 4, the impact panel 52 has a left half 58 and a right half 60. A vertical plane P may demarcate the left half 58 from the right half 60, as shown in FIGS. 4, 7, and 8. The vertical plane P may extend in vehicle-upward and vehicle-forward directions. The halves 58, 60 may be positioned relative to each other laterally, that is, in a cross-vehicle direction. The left half 58 may be disposed in a vehicle-forward direction from a left knee of an occupant of the front passenger seat 36 when the knee airbag 50 is in the inflated position, and the right half 60 may be disposed in a vehicle-forward direction from a right knee of an occupant of the front passenger seat 36 when the knee airbag 50 is in the inflated position.

With reference to FIGS. 4-8, a left tether 62 is releasably coupled to the instrument panel 42 and to the left half 58 of the impact panel 52, and a right tether 64 is releasably coupled to the instrument panel 42 and to the right half 60 of the impact panel 52. "Releasably coupled" means coupled in a manner that can be uncoupled such that the respective components may move relative to each other, as explained in more detail below with reference to FIGS. 9 and 10. The tethers 62, 64 extend through the inflation chamber 56 from the airbag housing 48 to the impact panel 52. For example, the tethers 62, 64 may be sewn to the impact panel 52. The tethers 62, 64 may be sewn to the forward panel 54 at the airbag housing 48. The tethers 62, 64 may be clamped to the airbag housing 48. The tethers 62, 64 may have loops 84 that are held by, e.g., components of the airbag housing 48. The tethers 62, 64 may be formed of, e.g., the same material as the knee airbag 50. The tethers 62, 64 may have a straplike or cordlike shape.

A left ring 66 and a right ring 68 may be attached to the forward panel 54. The left tether 62 may extend through the left ring 66, and the right tether 64 may extend through the right ring 68. The rings 66, 68 may be formed of a rigid material (e.g., rigid relative to the forward panel 54), such as plastic or metal, and be sewn into the forward panel 54. Alternatively, the rings 66, 68 may be formed of the same material as the knee airbag 50. A loop may be sewn to the forward panel 54, or two ends of a strap may be sewn to the forward panel 54, forming a loop with the forward panel 54. When the knee airbag 50 is in the inflated position, the left ring 66 may be disposed in a vehicle-forward direction from a left knee of an occupant of the front passenger seat 36, and the right ring 68 may be disposed in a vehicle-forward direction from a right knee of the occupant of the front passenger seat 36.

Figure 9:
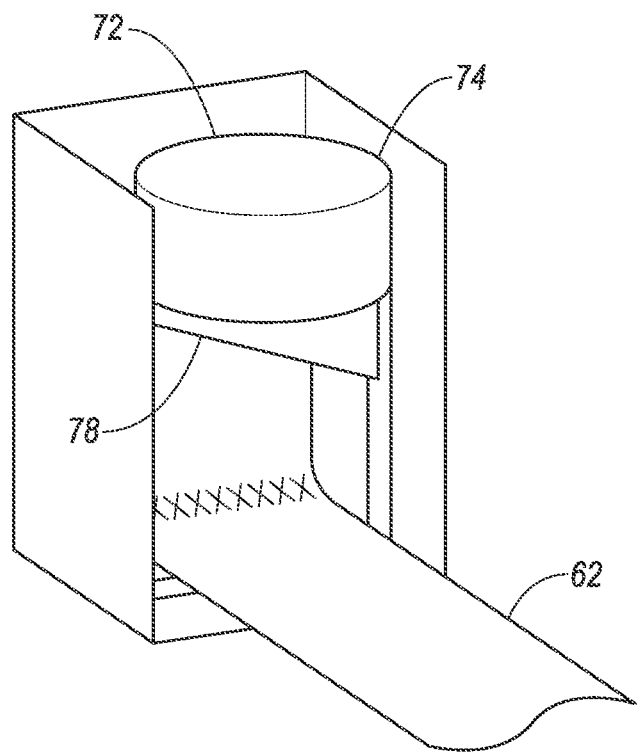
FIG. 9 is a perspective view of a cutter and the tether.
Figure 10:
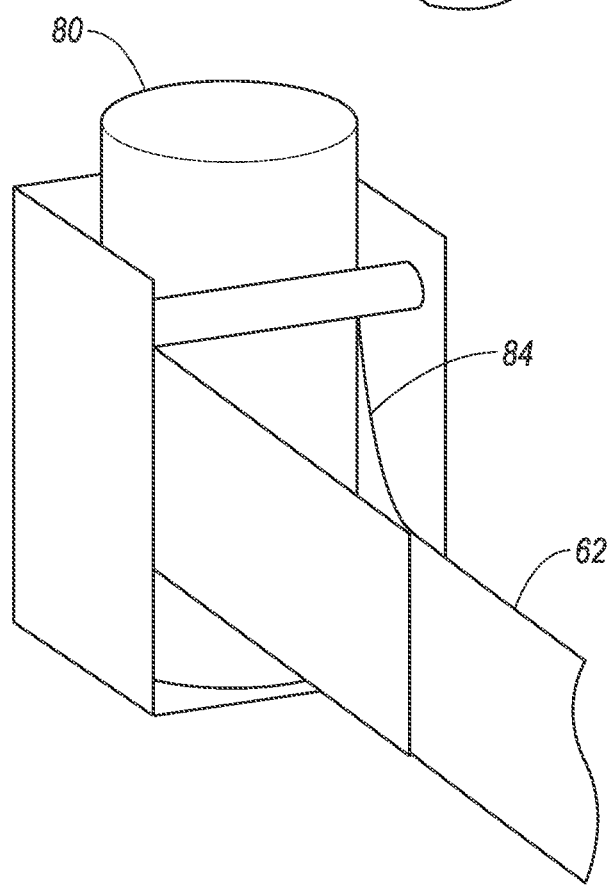
FIG. 10 is a perspective view of a release pin and the tether.
Figure 11:
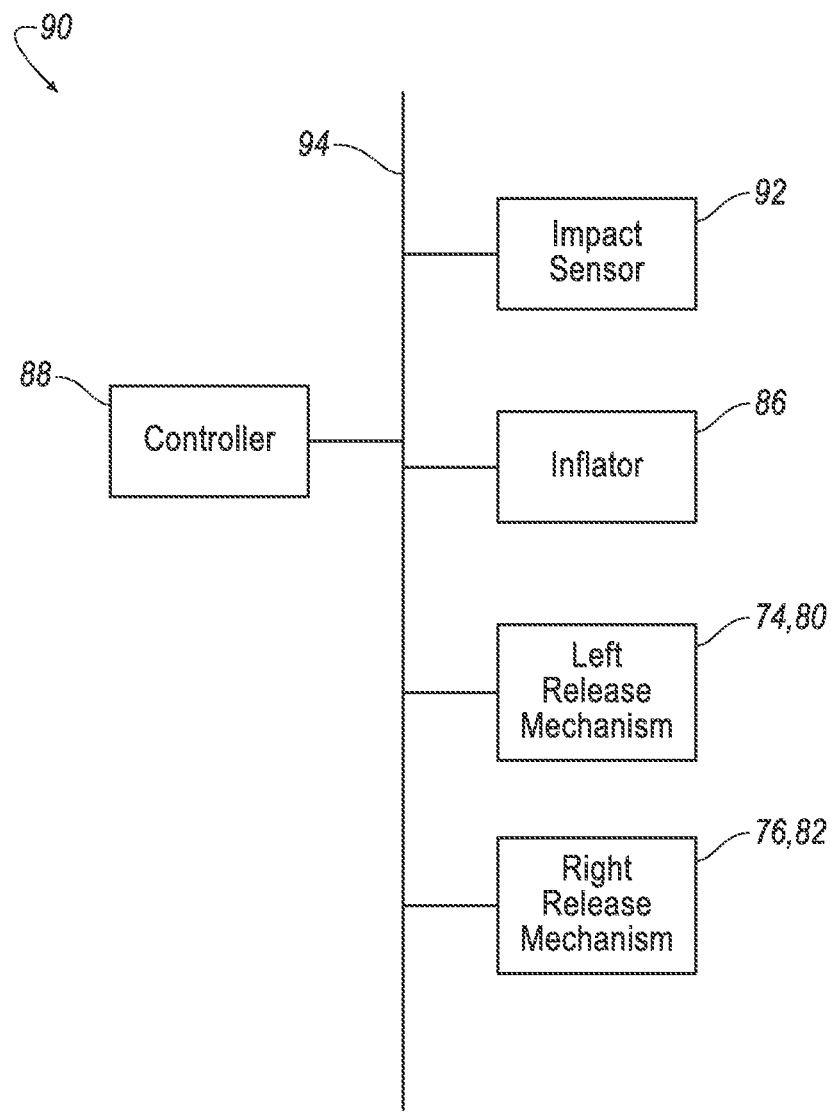
FIG. 11 is a block diagram of a control system for the airbag.

With reference to FIGS. 9-11, a left release mechanism 74, 80 and a right release mechanism 76, 82 may be fixed relative to the airbag housing 48. The left release mechanism 74, 80 may be positioned to release the left tether 62, and the right release mechanism 76, 82 may be positioned to release the right tether 64. The right release mechanism 76, 82 (not shown in FIGS. 9 and 10) may be identical to the left release mechanism 74, 80 (shown in FIGS. 9 and 10). "Release" means that the tether 62, 64 becomes uncoupled from the instrument panel 42. For example, the tethers 62, 64 may be freed, detached, severed, etc.

With reference to FIG. 9, for example, the left release mechanism 74, 80 may be a left cutter 74 positioned to sever the left tether 62, and the right release mechanism 76, 82 may be a right cutter 76 positioned to sever the right tether 64. The right cutter 76 (not shown in FIG. 9) may be identical to the left cutter (shown in FIG. 9). The cutters 74, 76 may each have a sharp edge 78 directed at the respective tether 62, 64, and a mechanism such as a firing pin 72 for driving the sharp edge 78 toward the tether 62, 64. The sharp edges 78 of the cutters 74, 76 may be sharp enough to slice the tethers 62, 64.

With reference to FIG. 10, for another example, the left release mechanism 74, 80 may be a left release pin 80 coupling the left tether 62 to the airbag housing 48, and the right release mechanism 76, 82 may be a right release pin 82 coupling the right tether 64 to the airbag housing 48. The right release pin 82 (not shown in FIG. 10) may be identical to the left release pin 80 (shown in FIG. 10). The tethers 62, 64 may each have the loop 84 extending around the respective release pin 80, 82. When the release pin 80, 82 discharges, the release pin 80, 82 jettisons out of the loop 84 and no longer holds the respective tether 62, 64.

With reference to FIG. 11, an inflator 86 may be connected to the knee airbag 50. Upon receiving a signal from, e.g., a controller 88, the inflator 86 may inflate the knee airbag 50 with an inflatable medium, such as a gas. The inflator 86 may be, for example, a pyrotechnic inflator that uses a chemical reaction to drive inflation medium to the knee airbag 50. The inflator 86 may be of any suitable type, for example, a cold-gas inflator.

A control system 90 may include the controller 88, the inflator 86, an impact sensor 92, and the release mechanisms 74, 80, 76, 82. The control system 90 may transmit signals through a communications network 94 such as a controller area network (CAN) bus, Ethernet, Local Interconnect Network (LIN), and/or by any other wired or wireless communications network. The controller 88 may be in communication with the inflator 86, the impact sensor 92, and the release mechanisms 74, 80, 76, 82 via the communications network 94.

The impact sensor 92 is adapted to detect an impact to the vehicle 30. The impact sensor 92 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 92 may be located at numerous points in or on the vehicle 30.

The controller 88 may be a microprocessor-based controller. The controller 88 may include a processor, memory, etc. The memory of the controller 88 may include memory for storing instructions executable by the processor as well as for electronically storing data and/or databases. The controller 88 may be a restraint control module and may control the airbags 46, 50, seatbelts, etc. of the vehicle 30.

Figure 12:
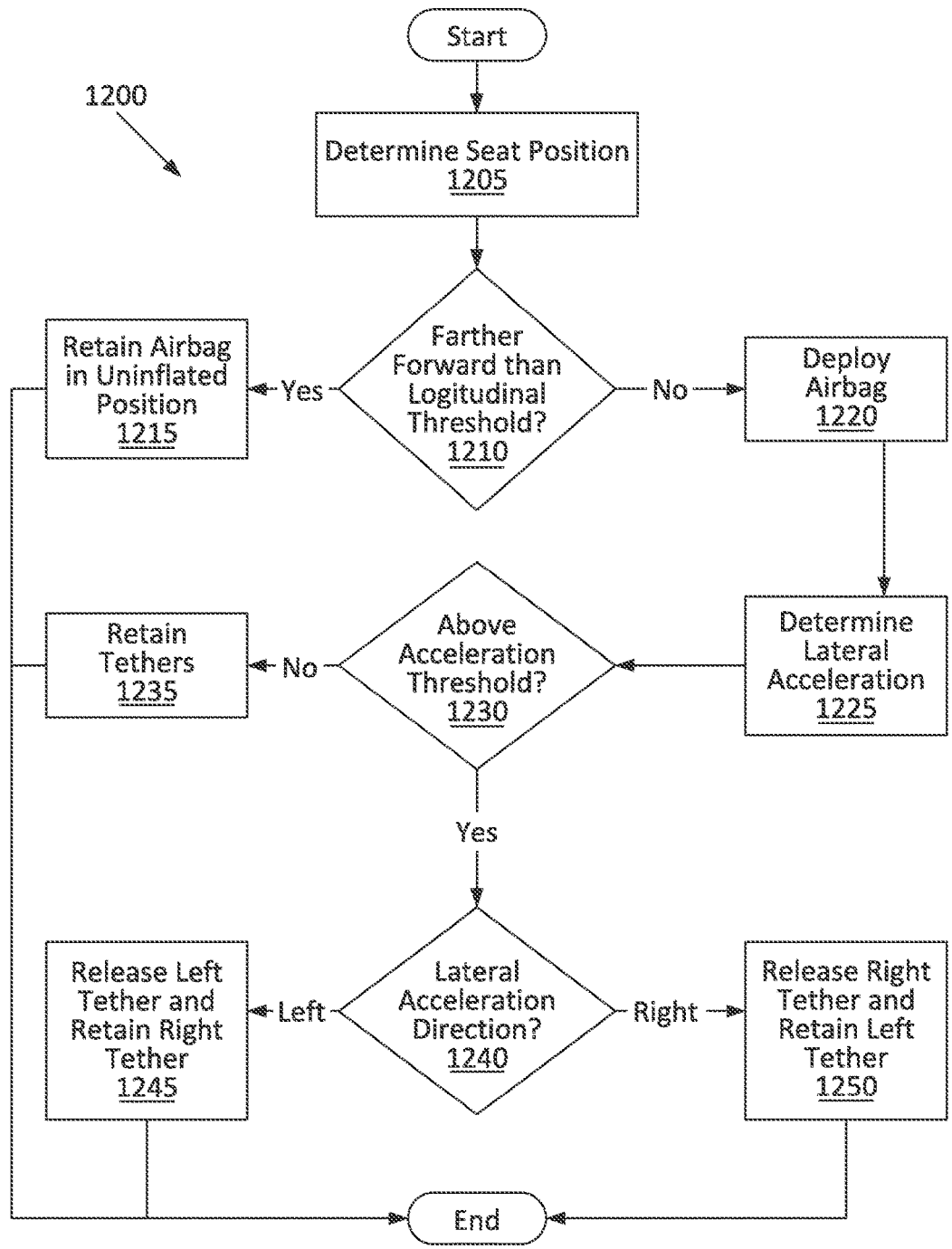
FIG. 12 is a process flow diagram of a process for deploying the airbag.

FIG. 12 is a process flow diagram illustrating an exemplary process 1200 for deploying the knee airbag 50. The memory of the controller 88 may store programming for performing the steps of the process 1200. The process 1200 begins when the controller 88 receives a signal through the communications network 94 from the impact sensor 92 indicating that the vehicle 30 has just experienced or is about to experience a frontal impact.

In a block 1205, the controller 88 receives a signal indicating a position of one of the seats 34, 36, for example, the front passenger seat 36. The position may be, for example, a longitudinal position, i.e., a position of the front passenger seat 36 along a vehicle-forward direction relative to the instrument panel 42, i.e., a distance from the instrument panel 42. Alternatively, the position may be a combination of multiple degrees of freedom of the front passenger seat 36, e.g., longitudinal position and height of a front of the seat bottom 38.

Next, in a decision block 1210, the controller 88 determines whether the front passenger seat 36 is farther forward than a longitudinal threshold. The longitudinal threshold is a position that the front passenger seat 36 may occupy, e.g., a position along a vehicle-forward direction. The longitudinal threshold may depend on the longitudinal position; may depend on a combination of the longitudinal position and height, e.g., the longitudinal position of the longitudinal threshold is farther from the instrument panel 42 as the height increases; or may be some other position threshold. If the position of the front passenger seat 36 is farther backward than the longitudinal threshold, i.e., is farther from the instrument panel 42 than the longitudinal threshold, then the process 1200 proceeds to a block 1220.

If the position of the front passenger seat 36 is farther forward than the longitudinal threshold, e.g., is closer to the instrument panel 42 than the longitudinal threshold, next, in a block 1215, the controller 88 retains the knee airbag 50 in the uninflated position. After the block 1215, the process 1200 ends.

If the position of the front passenger seat 36 is farther backward than the longitudinal threshold, i.e., is farther from the instrument panel 42 than the longitudinal threshold, in a block 1220, the controller 88 inflates the knee airbag 50. The controller 88 transmits an instruction via the communications network 94 to the inflator 86 to inflate.

Next, in a block 1225, the controller 88 receives a signal indicating lateral acceleration of the vehicle 30. Lateral acceleration is a component of acceleration of the vehicle 30 that is in a cross-vehicle direction, that is, to the left or to the right. Acceleration to the left may be represented, e.g., by negative numbers and to the right with positive numbers. Alternatively or additionally, the controller 88 may receive a signal indicating lateral velocity of the vehicle 30.

Next, in a decision block 1230, the controller 88 determines whether an absolute value of the lateral acceleration is below an acceleration threshold. In other words, the controller 88 determines whether the impact is a frontal impact, with the lateral acceleration below the acceleration threshold, or an oblique frontal impact, with the lateral acceleration above the acceleration threshold. The acceleration threshold may be chosen to be a value above which the passenger airbag 46 may cause a torque on a head of the occupant that is above a value known to cause injury or above a value specified by, e.g., government regulations. If the absolute value of the lateral acceleration is above the acceleration threshold, the process 1200 proceeds to a decision block 1240. Alternatively, the controller 88 may determine whether the lateral velocity or a value from a formula of the lateral acceleration and lateral velocity exceeds a velocity threshold or combined threshold, respectively. The velocity or combined threshold may be chosen based on head torque, government regulations, etc., as described for the acceleration threshold.

If the absolute value of the lateral acceleration is below the acceleration threshold (or, alternatively, the lateral velocity or formula value does not exceed the velocity or combined threshold), next, in a block 1235, the controller 88 retains the tethers 62, 64. In other words, neither of the tethers 62, 64 are released. After the block 1235, the process 1200 ends.

If the absolute value of the lateral acceleration is above the acceleration threshold (or, alternatively the lateral velocity or formula value exceeds the velocity or combined threshold), in a decision block 1240, the controller 88 determines a direction of the lateral acceleration. If the lateral acceleration is negative, then the impact is a left oblique impact, that is, an impact occurring from the left side of the vehicle 30. If the lateral acceleration is positive, then the impact is a right oblique impact, that is, an impact occurring from the right side of the vehicle 30. (The convention may be reversed.) If the impact is a left oblique impact, then the process 1200 proceeds to a block 1245; if the impact is a right oblique impact, then the process 1200 proceeds to a block 1250.

To summarize the blocks 1245 and 1250 below, the controller 88 selectively releases one of the tethers 62, 64 based on a direction of impact, e.g., whether the impact is a left or right oblique impact. Specifically, the controller 88 may release the tether 62, 64 closer to the side of impact and retain the tether 62, 64 farther from the side of impact.

If the impact is a left oblique impact, after the decision block 1240, in a block 1245, the controller 88 releases the left tether 62 and retains the right tether 64. The controller 88 transmits an instruction via the communications network 94 to the left release mechanism 74, 80 to release the left tether 62. For example, the controller 88 may transmit an instruction to the left cutter 74 to sever the left tether 62. For another example, the controller 88 may transmit an instruction to the left release pin 80 to discharge and free the left tether 62. After the block 1245, the process 1200 ends.

If the impact is a right oblique impact, after the decision block 1240, in a block 1250, the controller 88 releases the right tether 64 and retains the left tether 62. The controller 88 transmits an instruction via the communications network 94 to the right release mechanism 76, 82 to release the right tether 64. For example, the controller 88 may transmit an instruction to the right cutter 76 to sever the right tether 64. For another example, the controller 88 may transmit an instruction to the right release pin 82 to discharge and free the right tether 64. After the block 1250, the process 1200 ends.

The process 1200 has been recited by way of example, not limitation. The controller 88 may additionally or alternatively include programming to, in defined circumstances, release both tethers 62, 64; retain both tethers 62, 64; selectively release one of the tethers 62, 64 followed by a delayed release of the other of the tethers 62, 64; etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   an instrument panel;
   an airbag coupled to the instrument panel and having an impact panel facing away from the instrument panel when the airbag is inflated, the impact panel having a left half and a right half;
   a left tether releasably coupled to the instrument panel and directly attached to the left half of the impact panel;
   a right tether releasably coupled to the instrument panel and directly attached to the right half of the impact panel; and
   a controller programmed to selectively release one of the left and right tethers based on an impact angle.

2. The restraint system of claim 1, wherein the controller is programmed to release the left tether in response to a left oblique impact and to release the right tether in response to a right oblique impact.

3. The restraint system of claim 2, wherein the controller is programmed to retain the right tether in response to a left oblique impact and to retain the left tether in response to a right oblique impact.

4. The restraint system of claim 3, wherein the controller is programmed to receive a signal indicating lateral acceleration of a vehicle including the restraint system, determine that an absolute value of the lateral acceleration is below an acceleration threshold, and retain the tethers in response to determining that the absolute value of the lateral acceleration is below the acceleration threshold.

5. The restraint system of claim 4, further comprising an inflator connected to the airbag and in communication with the controller, wherein the controller is further programmed to inflate the airbag in response to an impact.

6. The restraint system of claim 5, wherein the controller is programmed to receive a signal indicating a position of a seat, determine that the seat is farther forward than a longitudinal threshold, and retain the airbag in an uninflated position in response to determining that the seat is farther forward than the longitudinal threshold.

7. The restraint system of claim 1, further comprising a left ring through which the left tether extends, and a right ring through which the right tether extends.

8. The restraint system of claim 7, wherein the airbag has a forward panel facing toward the instrument panel when the airbag is inflated, and the rings are attached to the forward panel.

9. The restraint system of claim 1, further comprising an airbag housing coupled to the instrument panel, wherein the airbag is inflatable from an uninflated position to an inflated position, and the airbag in the uninflated position is disposed in the airbag housing.

10. The restraint system of claim 9, further comprising a left release mechanism and a right release mechanism fixed relative to the airbag housing and in communication with the controller, wherein the left release mechanism is positioned to release the left tether, and the right release mechanism is positioned to release the right tether.

11. The restraint system of claim 10, wherein the left release mechanism is a left cutter positioned to sever the left tether, and the right release mechanism is a right cutter positioned to sever the right tether.

12. The restraint system of claim 10, wherein the left release mechanism is a left release pin coupling the left tether to the airbag housing, and the right release mechanism is a right release pin coupling the right tether to the airbag housing.

13. The restraint system of claim 12, wherein the controller is further programmed to selectively discharge the release pins based on an impact angle.

14. The restraint system of claim 1, further comprising an impact sensor in communication with the controller.

15. The restraint system of claim 1, wherein the airbag is disposed to inflate at least partially below the instrument panel.

16. The restraint system of claim 1, wherein the airbag is positioned to contact knees of a 50th percentile occupant of a seat facing the instrument panel when the airbag is inflated.

17. A restraint system comprising; an instrument panel; an airbag coupled to the instrument panel and having an impact panel facing away from the instrument panel when the airbag is inflated, the impact panel having a left half and a right half; a left tether releasably coupled to the instrument panel and to the left half of the impact panel; a right tether releasably coupled to the instrument panel and to the right half of the impact panel; and a controller programmed to selectively release one of the left and right tethers based on an impact angle. a left ring through which the left tether extends, and a right ring through which the right tether extends.

18. The restraint system of claim 17, wherein the airbag has a forward panel facing toward the instrument panel when the airbag is inflated, and the rings are attached to the forward panel.

* * * * *